United States Patent
Chu et al.

(10) Patent No.: US 7,511,974 B2
(45) Date of Patent: *Mar. 31, 2009

(54) HIGH VOLTAGE CHARGING CIRCUIT

(75) Inventors: Yi-Shan Chu, Hsinchu (TW);
Ming-Nan Chuang, Hsinchu (TW);
Yuan-Wen Chang, Hsinchu (TW)

(73) Assignee: Leadtrend Technology Corp., Hsin-Chu (TW)

( * ) Notice: Subject to any disclaimer, the term of this patent is extended or adjusted under 35 U.S.C. 154(b) by 404 days.

This patent is subject to a terminal disclaimer.

(21) Appl. No.: 10/972,123

(22) Filed: Oct. 22, 2004

(65) Prior Publication Data

US 2005/0093518 A1 May 5, 2005

(30) Foreign Application Priority Data

Oct. 30, 2003 (TW) .............................. 92130231 A
May 14, 2004 (TW) .............................. 93113700 A

(51) Int. Cl.
*H02M 3/335* (2006.01)
(52) U.S. Cl. .................. 363/21.13; 320/166; 363/21.01
(58) Field of Classification Search ............... 363/21.01, 363/21.12, 21.13, 21.18, 97, 56.11; 320/166, 320/167
See application file for complete search history.

(56) References Cited

U.S. PATENT DOCUMENTS

| | | | |
|---|---|---|---|
| 6,219,493 B1 * | 4/2001 | Aoki et al. | 396/206 |
| 6,516,153 B2 * | 2/2003 | Honda et al. | 396/206 |
| 6,674,247 B1 * | 1/2004 | Mead et al. | 315/241 P |
| 6,982,882 B2 * | 1/2006 | Chu et al. | 363/21.01 |
| 2007/0164705 A1 * | 7/2007 | Chuang et al. | 320/128 |

* cited by examiner

*Primary Examiner*—Akm E Ullah
*Assistant Examiner*—Harry Behm
(74) *Attorney, Agent, or Firm*—Winston Hsu

(57) ABSTRACT

A high voltage charging circuit is provided with the ability of rapid charging. The circuit is composed of a turn-on control circuit, a turn-off control circuit and a transistor. The turn-on control circuit is adopted to set a turn-on time of a transistor such that the transformer may store magnetic energy, while the turn-off control circuit is used to set a turn-off time of the transistor such that the transformer may release the magnetic energy to charge a high voltage capacitor. Smaller inductance reduces the turn-on time of the power transistor owing to the maximum current of the primary side of the transformer. Therefore, a small-sized transformer may be employed to reduce the volume of the charging circuit with nonoccurrence of saturation.

15 Claims, 8 Drawing Sheets

HIGH VOLTAGE CHARGING CIRCUIT

This application claims the benefit of Taiwan Patent Application No. 92130231 filed on Oct. 30, 2003, and No. 93113700 filed on May 14, 2004, which are hereby incorporated by reference for all purposes as if fully set forth herein.

BACKGROUND OF THE INVENTION

1. Field of Invention

The invention relates to a high voltage charge circuit, and particularly to a high voltage charge circuit with the ability of rapid charging.

2. Related Art

When taking a picture with a camera, a user usually uses a flash to provide sufficient light to the external environment. However, the working voltage for a flash, e.g. 300V, is much higher than the DC voltage provided by the camera, e.g. 5V. To solve this problem, a camera is set up with a high voltage charge circuit. The DC voltage (low voltage) is raised to a high voltage using a transformer having a high winding ratio charging a high voltage capacitor. When the high voltage capacitor is charged to match the working voltage of the flash, the high voltage capacitor is used as a source to provide the desired working voltage.

The prior high voltage charge circuit 10 is also referred to as a ring chock converter (RCC). As shown in FIG. 1, the RCC 10 comprises a DC source 12, e.g. 5V, resistors 14, 16 and 30, a power transistor 18, a transformer 20, a diode 22, a high voltage capacitor 24, e.g., 300V, a Zener diode 26 with a break down voltage of 300V, a capacitor 28 and a standby control circuit 32. The transformer 20 has primary side windings N1, secondary side windings N2 and auxiliary side windings N3, where the primary side windings and the auxiliary side windings N3 may induct with the secondary side windings N2. The primary side windings N1 have opposite polarity with the secondary side windings N2 and the secondary side windings N2 have a winding number N times the winding number of the primary side windings N1, e.g., 60 times.

When the DC source 12 provides a current to the transformer 20, the resistor 14 and the primary side windings N1 are turned on and the power transistor 18 is operated in a saturation region. Next, the auxiliary windings N3 and resistor 14 are turned on. At this time, the current flowing through the primary windings N1 is a magnetic current whose energy is stored in the transformer and does not charge the high voltage capacitor 24.

When the current flowing through the resistor 14 gradually increases, the power transistor 18 is operated from the saturation region to the active region to decrease the current flowing through the primary side windings and invert the polarities of the primary and secondary windings N1 and N3. At that time, the power transistor 18 is cut off and the secondary windings N1 and the diode 22 turn on. After the secondary side windings N2 transfer the energy stored in the transformer 20 to the high voltage capacitor 24, the primary side windings N1 go back to their initial state. Then the loop of the resistor 14 becomes conductive again and the entire process repeats.

When the high voltage 24 reaches a predetermined voltage level, e.g. 300V, it enables the Zener diode 26 to break down and leads to a short circuit. At that time, the standby control circuit 32 is triggered to stop the operation of the transformer 20, and the high voltage capacitor 24 is no longer charged.

FIG. 2 is a diagram depicting the relation between the charging current and time. It can be seen from the drawing that when the charging current becomes zero the transformer 20 begins to work, providing a charging current to charge the high voltage capacitor 24.

From the above, it may be known that the prior high voltage charging circuit 10 has the following disadvantages:

1. In the prior art the power transistor 18 is a bi-polar junction transistor (BJT) that when turned on requires an additional driven base current. Since the power transistor has a saturated voltage VCE of about 300 m and consumes a great deal of power, the charging effect may not be satisfactory.

2. Since the transformer 20 requires the winding N3 and the power transistor 18 generally has a switch frequency of 10 kHz, the transformer is not easily miniaturized.

3. Since the prior high voltage charging circuit is not operated in a continuous conduction mode, it may not be efficient enough.

SUMMARY OF THE INVENTION

In view of the foregoing problem, an object of the invention is to provide a high voltage charging circuit with rapid charging ability.

In view of the foregoing problems, another object of the invention is to provide a high voltage charging circuit to reduce the volume of the transformer.

To achieve the above objects, the invention discloses a high voltage circuit that charges a high voltage capacitor and comprises a DC source outputting a large current with a low logic level and outputting a small current by performing energy transformation; a diode with a small current and a high logic level, outputting a current to the high voltage capacitor to charge the high voltage capacitor; a power transistor enabling a transformer with a large current and a low logic current, performing energy transformation while not outputting a small current with a high logic level when the power transistor is turned on, disenabling the transformer with a large current and a low logic level, performing energy transformation and outputting a small current with a high logic level when the power transistor is not turned on; a turn-on control circuit controlling the turn-on time of the power transistor; and a turn-off control circuit controlling the turn-off time of the power transistor, wherein the turn-on control circuit and the turn-off control circuit control the turn-on time or turn-off time by controlling a positive output signal of the positive output of a flip-flop.

According to the principle of the invention, since an extreme value of the primary side current of the transformer may setup the turn-on time of the power transistor to be shorter, the invention may use a miniature transformer that will not become saturated, achieving the object of reducing the volume of the high voltage charging circuit.

The detailed description of the features and advantages of the invention will be given in the following, which may enable a person skilled in the art to realize and implement the invention.

It is to be understood that both the foregoing general description and the following detailed description are exemplary and explanatory and are intended to provide further explanation of the invention as claimed

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE INVENTION

The features and implementation of the preferred embodiment of the invention will be described in detail with the accompanying drawings.

Figure 1:
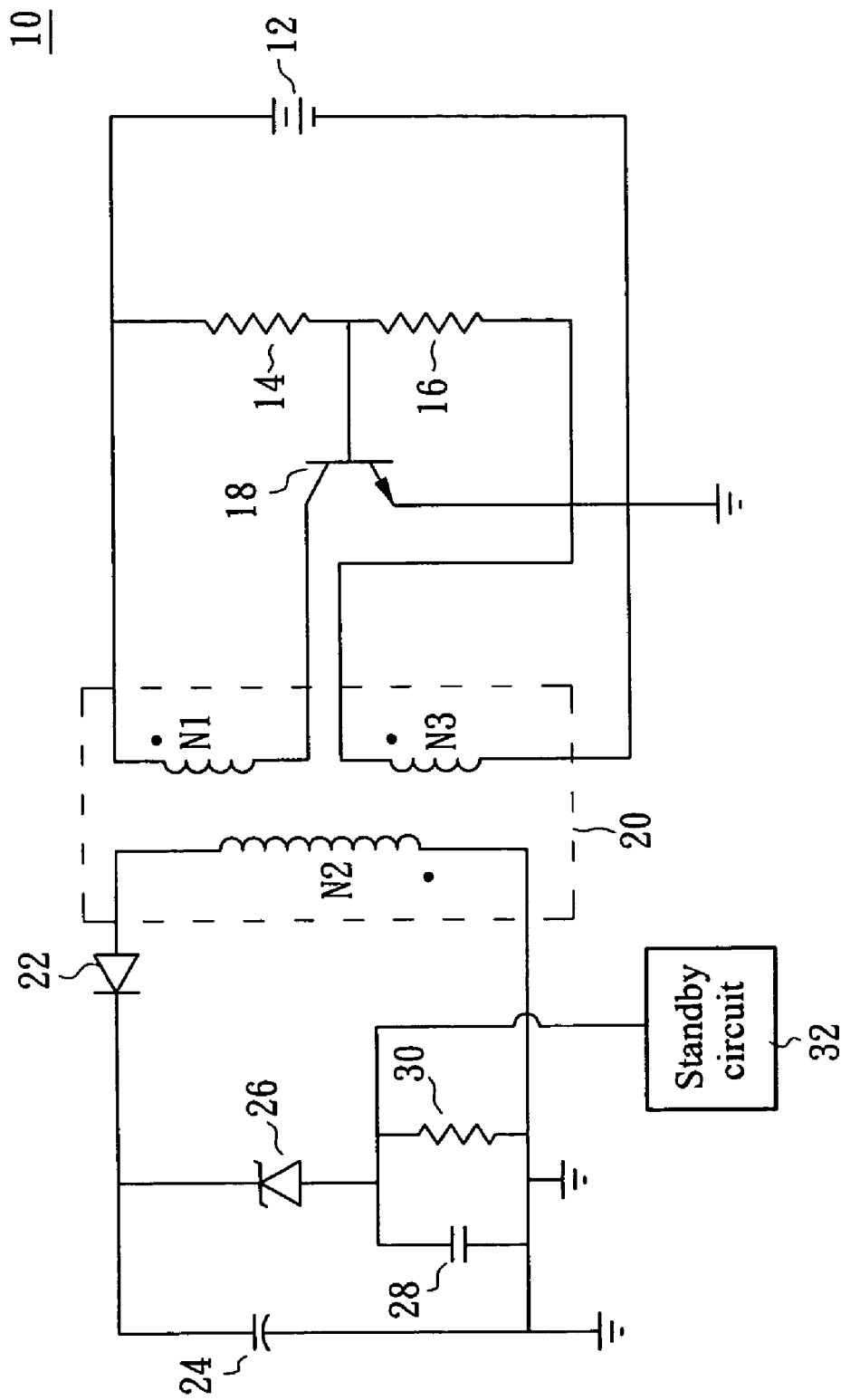
FIG. 1 is a block diagram of a high voltage charging circuit in the prior art.
Figure 2:
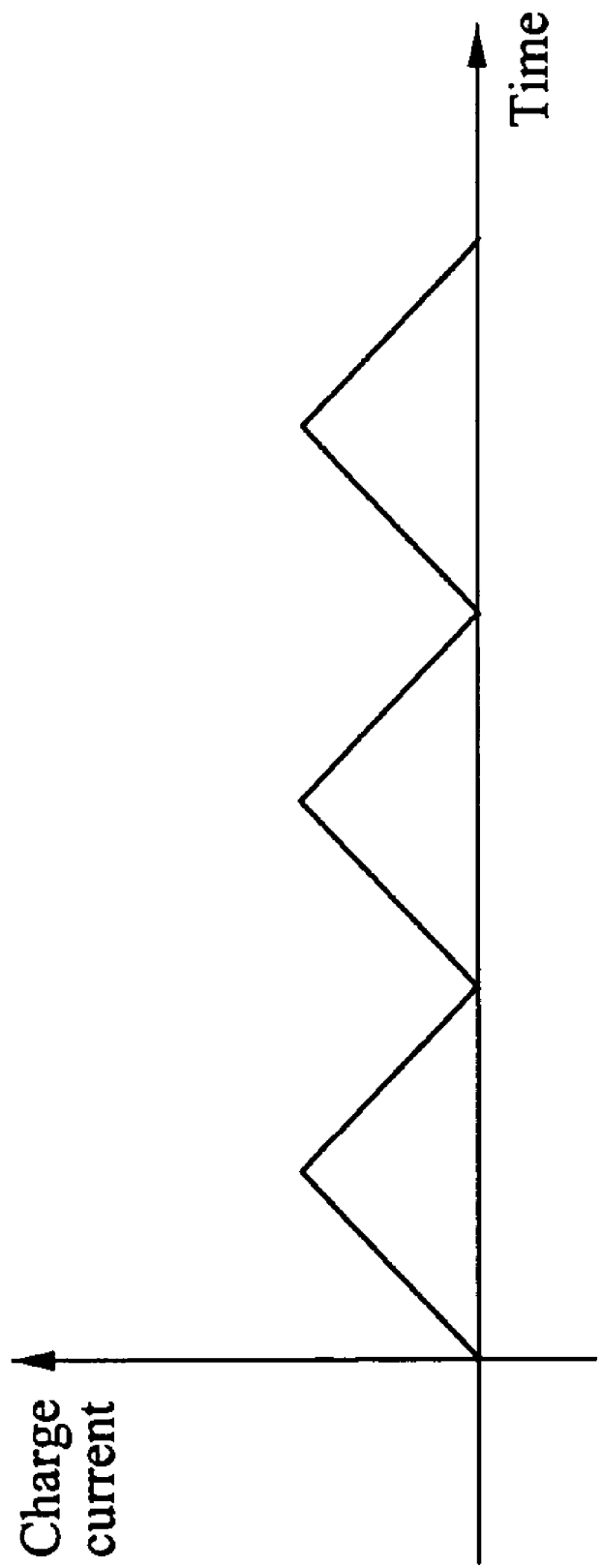
FIG. 2 depicts the relation between charging and the corresponding time in a high voltage charging circuit in the prior art.
Figure 3:
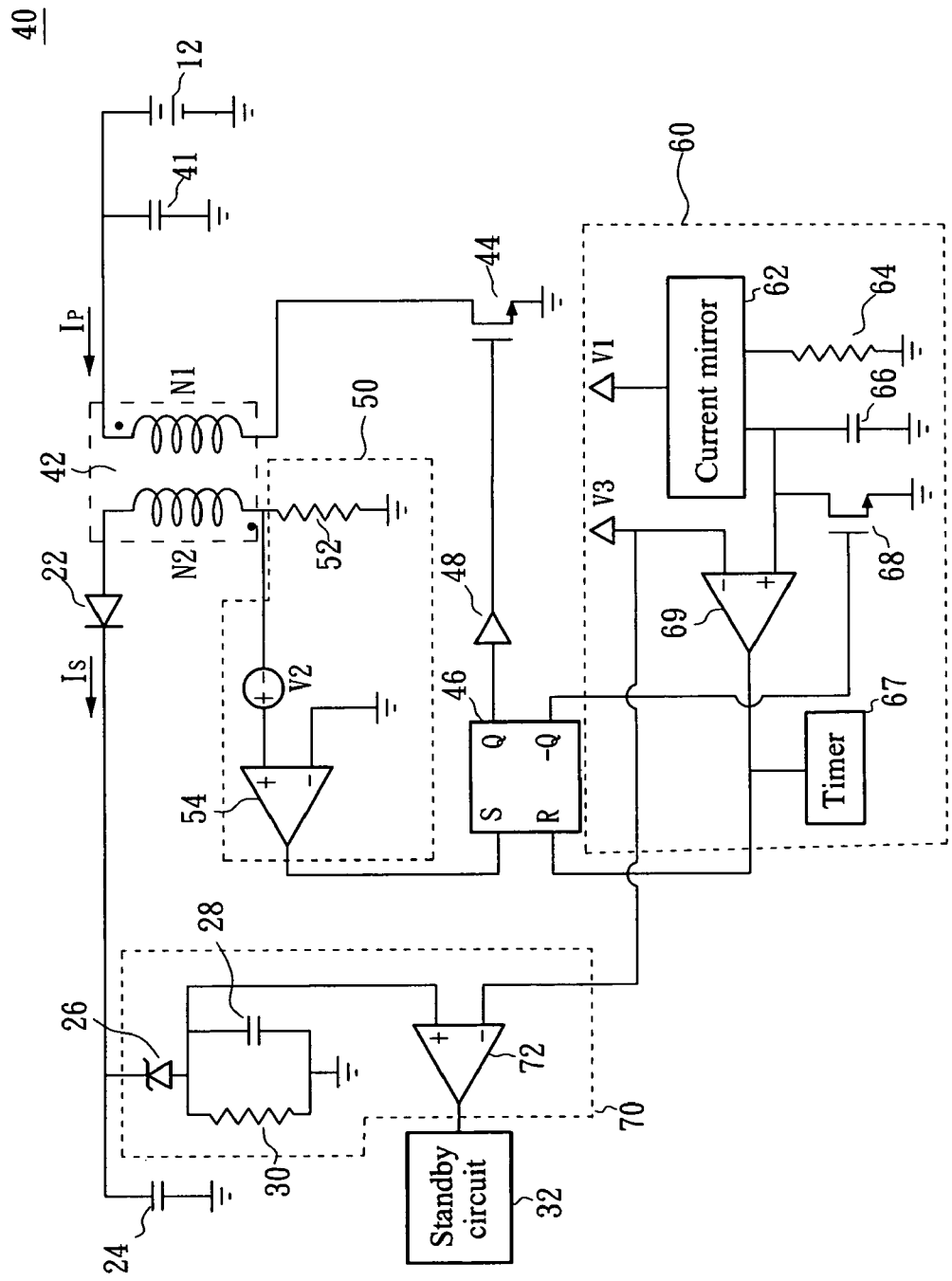
FIG. 3 is a block diagram of a high voltage charging circuit according to the invention.

FIG. 3 illustrates a first embodiment of a high voltage charging circuit according to the invention. Referring to FIG. 3, the circuit 40 includes three units, which are a turn-off control circuit 50, turn-on control circuit 60 and a standby detection circuit 70. The turn-on control circuit 60 is used to enable a positive output signal Q of the positive output of a flip-flop 46 to output a high logic level signal to control the turn-on time of a power transistor 44 by controlling an output with a low logic level to a reset terminal of the flip-flop 46. The turn-off control circuit 50 enables the positive output signal Q of the positive output of the flip-flop 46 to have a low logic level to control the turn-off time of the power transistor by outputting a low logic level signal to the set terminal of the flip-flop. The standby detection circuit 70 is used to detect the voltage level of the charging capacitor 28. If the charging capacitor is charged to a predetermined voltage level, e.g., 300V, the standby detection circuit 70 outputs a detection signal to enable an operation of the standby control circuit 32, which stops the charging capacitor of the invention. As such, the high voltage charging circuit 40 does not charge the high voltage charging capacitor 24 any more. In the above, the primary side windings N1 of the transformer 42 have an inductance of Lp, and a secondary side windings N2 have an inductance of LS. The secondary side windings N2 have N times windings as compared to the primary side windings N1.

When the high voltage charging circuit 40 is initialized, the secondary side current is zero, the voltage across a resistor 52 is zero and the comparator 54 outputs a high logic level signal. At this time, the flip-flop 46 has a high logic level at its set terminal, enabling the positive output signal Q of the positive output of the flip-flop 46 to have a high logic level, causing the power transistor 44 to turn on and enter into a saturation state. Because of the current mirror 62, a current begins to charge an internal capacitor 66 of the turn-on control circuit 60 from a zero voltage and the current is as large as the current flowing through a resistor 64. When the voltage across the capacitor 66 is less than V3, the power transistor 44 continues to be turned on. When the capacitor 66 is charged to a voltage greater than V3, the comparator 69 outputs a high logic level signal to the reset terminal of the flip-flop 46, enabling the positive signal Q of the positive output of the flip-flop 46 to be a low logic level signal of flip-flop 46. The low logic level output signal is driven by a driver 48 and then turns off the power transistor 44, i.e. the power transistor 44 enters into a cut-off state. When the power transistor 44 is turned on by the turn-on control circuit 60, this is referred to as the on time. When the power transistor 44 is in the on state, the DC source 12 provides a primary side current Ip to the transformer 42. Since the polarity of the secondary side of the transformer may not turn on the diode, the energy generated by the primary side current Ip is stored in the transformer 42 in the form of magnetic energy. The primary side current IP has its maximum IP,max, presented in the following equation:

$$I_{P,\max} = ((V_{in} - V_{ds})/L_P) \times t_{ON} \quad (1)$$

wherein Vin is the input voltage provided by the DC source 12, Vds is the voltage across the power transistor 44. When the power transistor 44 turns on, Vds is considerably low and thus neglected, so equation (2) may be simplified as:

$$I_{P,\max} = (V_{in}/L_P) \times t_{ON} \quad (2)$$

wherein Vin/LP is the slope of the increase of the primary side current IP and tON is the turn-on time of the power transistor 44, which is identical to the turn-on time of the primary side windings N1 and is also called a turn-on time. The tON may be determined by the resistance of the resistor 64 and the capacitance of the capacitor 66. Since the charging current for the capacitor 66 is a ratio of the voltage V1 to the resistance of the resistor 64, simply adjusting the resistance of the resistor 64 may change the value of tON and consequently change the maximum IP,max of the primary side current IP. Also, a change of the charging current may lead to a change of tON. When a user selects the resistance of the resistor 64, tON is fixed. It may be seen from equation (2) that the less Vin is, the less the maximum IP,max of the primary side current IP is. When Vin falls, the charging current also decreases, so the high voltage charging circuit 40 according to the invention may provide a charging mode with a varied current, which may lengthen the lifetime of the DC source 12 when Vin is low. In addition, it may be seen through equation (2) that a user may obtain the same maximum IP,max of the primary side current IP by use of a lesser Lp. In this case, tON may be lessened, which prevents the smaller transformer 14 from being saturated. Hence, the object of reducing the volume of the high voltage charging circuit 40 may be achieved.

When the flip-flop 46 outputs a low logic level signal at its positive output terminal, the flip-flop 46 simultaneously outputs a high logic level signal −Q at its negative output terminal. The high logic level output signal turns the transistor 68 on, and the energy stored in the capacitor 66 is removed.

In the above, the capacitor 41 is a regulated capacitor, and the power transistor 44 is preferably an NMOS transistor with its gate connected to the driver 48 to maintain its operation. The preferred power transistor has the advantages of fast response speed and reduced turn-on resistance (RDS,ON). Certainly, the power transistor 44 may also be a PMOS transistor and its gate has to be connected to a negative driver.

The counter 67 adds 1 to its value every 1 µs. When the value of the counter 67 exceeds a threshold, e.g. 10, the counter 67 outputs a high logic level to the reset terminal of the flip-flop 46 and the value of the counter 46 is reset to 0. Therefore, the turn-on time controlled by the turn-on control circuit 60 may be controlled by the counter and thus the primary side current IP may be limited as well. In this case, the primary side current IP may be prevented from continuous increase due to the open state of the resistor 64.

During the turn-on time, the polarity at the secondary side of the transformer 42 may not turn on the diode 22. At this time, the secondary side current Is is zero, and the voltage across the resistor 52 is zero. When the voltage across the capacitor 66 is greater than the voltage V3, the flip-flop 46 closes the power transistor 44, i.e., the transistor 44 enters into a cut-off state. When the power transistor 44 is cut off, the diode 22 is turned on because the magnetic energy has to be continuous, enabling the transformer 42 to charge the high voltage capacitor 24 with its previously stored magnetic energy. At this time, the transformer 42 has current Is at its secondary side and the current Is reduces. The current Is decreases with the rate of the ratio between Vout, the voltage level of the high voltage capacitor, Ls, and the inductance of the secondary side of the transformer 42. Since Vout increases at a slow rate in the whole charging process, the secondary side current IS has a varied decrease rate. When the voltage across the resistor 52 is greater than the voltage V2, the comparator 54 outputs a low logic signal to a set terminal of the flip-flop 46 and the power transistor 44 continues to be in a cut-off state. The turn-off control circuit 50 continues to cut off the power transistor 44. When the voltage across the resistor 52 is less than V2, the comparator 54 outputs a high logic level signal to the set terminal of the flip-flop 46, which turns on the power transistor 44 after the operation of the driver 48. When the turn-off control circuit 50 turns off the power transistor 44, this is termed OFF time.

The maximum IS,max of the secondary side current IS may be presented in the following equation:

$$I_{S,max} = \frac{N_1}{N_2} \times I_{P,max} \quad (3)$$

When the secondary side current IS decreases to the ratio between the voltage V2 and the resistance of the resistor 52 (the current of the secondary side current IS is defined as a minimum Imin/N), the comparator 54 outputs a high logic level signal to the set terminal of the flip-flop, enabling the power transistor 44 to enter into a saturation state. The primary side windings N1 then begin to conduct and the primary side current IP begins to flow from the minimum current Imin. When the above steps are repeated, the transformer 42 may continuously charge the high voltage capacitor 24 until the high voltage capacitor 24 reaches a voltage level of 300V.

Now the standby detection circuit 70 is described. When the high voltage capacitor 24 reaches a voltage level of 300 V, the Zener diode 26 breaks down and charges the capacitor 28. Until the capacitor 28 has a greater voltage difference than the voltage V3, the comparator 72 outputs a detection signal to the standby control circuit 32, enabling the high voltage charging circuit 40 to stop.

Figure 4:
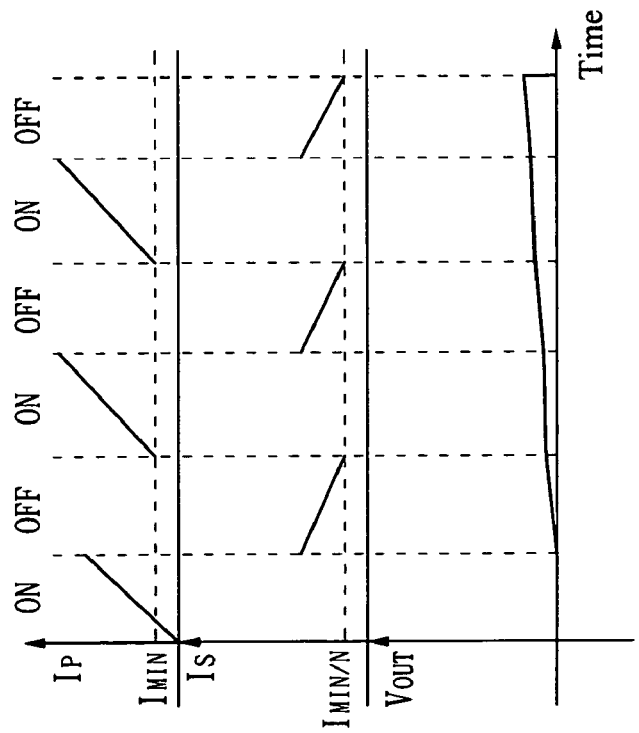
FIG. 4 is a diagram illustrating the relation of the voltage level of a primary side current, a secondary side current, a charging current and a high voltage capacitor under a continuous charging mode.
Figure 5:
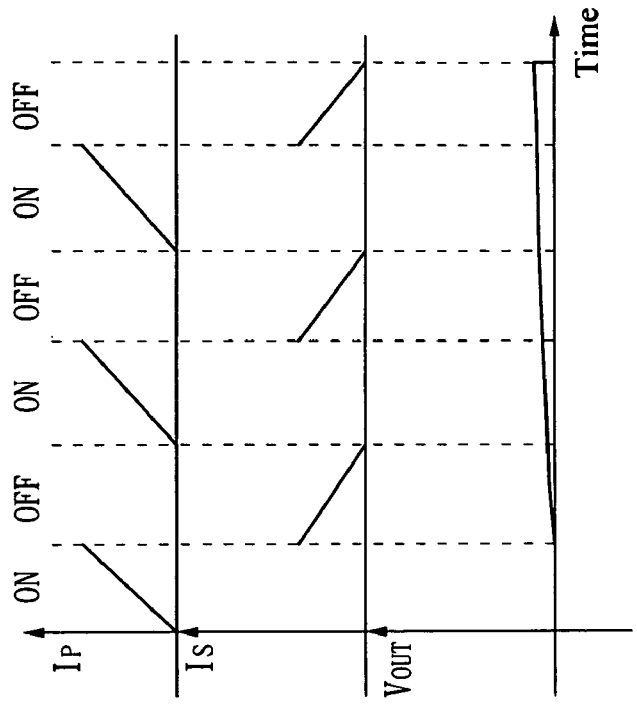
FIG. 5 is a diagram illustrating the relation of the voltage level of a primary side current, a secondary side current, a charging current and a high voltage capacitor under a boundary charging mode.

The minimum current Imin may be set by a user. For example, when the minimum current Imin is greater than zero, the high voltage charging circuit 40 in the invention continues to charge the high voltage capacitor 24, which is referred to as in a continuous charging mode. The variations of the primary side current Ip, the secondary side current Is and Vout may be readily known through FIG. 4 during the period the power transistor 44 turns on and off. Since the high voltage charging circuit 40 charges the high voltage capacitor 24 in a continuous charging mode, the charging efficacy is better than the continuous/non-continuous charging efficacy used in the prior art. In addition, the minimum current Imin may be set as zero. The high voltage charging circuit 40 then charges the high voltage capacitor 24 in a continuous/non-continuous mode, also termed the boundary charging mode. Referring FIG. 5, the variations of the primary side current Ip, the secondary side current Is and Vout when the power transistor 44 is on and off may be clearly known.

In the embodiment illustrated in FIG. 3, when V1=Vin, the higher the input voltage Vin, the faster the charging speed of the capacitor 66 and tON, wherein the value of tON may be determined by the resistor 64 and the capacitor 66 since the charging current for the capacitor 66 is equal to the value of the ratio of the input voltage Vin and the resistance of the resistor 64. On the other hand, the less input voltage Vin, the slower the charging of the capacitor 66 and the greater tON. That is, the value of Vin×Ton may be kept constant.

Therefore, a user may change the value of Vin×tON by adjusting the resistance of the resistor 64, and the value of the maximum current IP,max of the primary side current IP may also be changed. When the resistance of the resistor 64 is fixed, the value of Vin*tON is also fixed, and the maximum current IP,max of the primary side current IP may not change with Vin, so the invention provides a constant-current charging mode.

Figure 6:
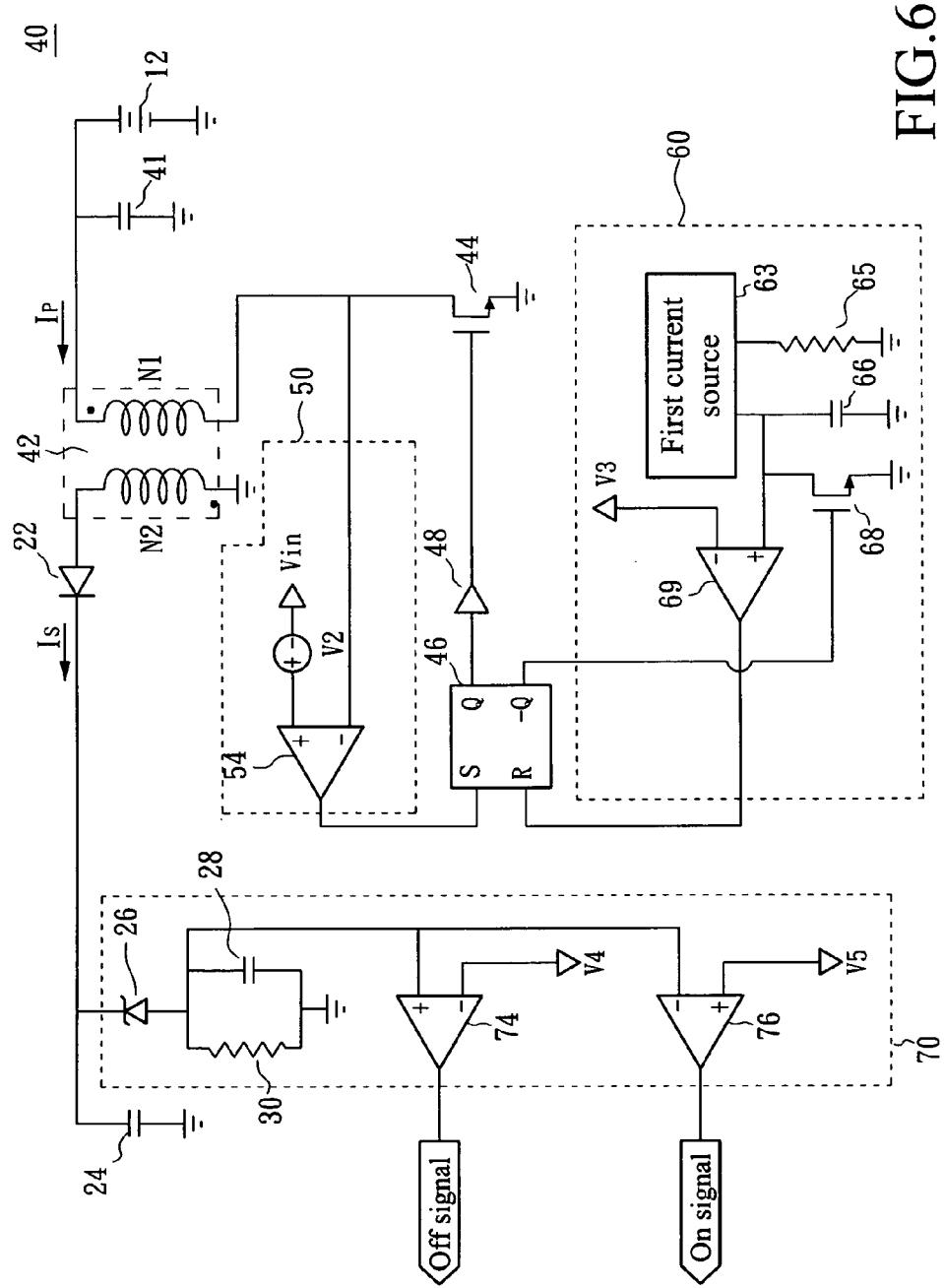
FIG. 6 is a block diagram of a second embodiment according to the invention.

FIG. 6 illustrates a second embodiment of the high voltage charging circuit 40 according to the invention.

Referring to FIG. 6, the high voltage charging circuit 40 also comprises the turn-off control circuit 50 and the turn-on control circuit 60. The turn-on control circuit 60 is used to receive the input voltage Vin and is connected to the negative output (−Q) and the reset terminal (R) of the flip-flop 46. The turn-off control circuit 50 is connected to the set terminal (S) of the flip-flop 46. In this embodiment, the turn-off control circuit 50 operates according to the voltage Vin provided by the DC source 12 and the voltage difference of the power transistor 44 Vds. The transformer 42 is connected at one terminal of its secondary side to the ground.

In the second embodiment, the turn-on control circuit 60 comprises a first current source 63, a capacitor 66, a comparator 69 and a transistor 68. The first current source 63 and the capacitor 66 are coupled together, providing a first charging current to the capacitor 66 and charging the capacitor 66, wherein the first charging current Ip=(Vin×Ton)/Lp. When the voltage across the capacitor 66 is the first reference voltage 3, the power transistor 44 is always turned on. When the capacitor 66 is charged to a voltage level greater than the first reference voltage V3, the comparator 69 outputs a reset signal to the reset terminal (R) of the flip-flop 46 to control a positive output signal at the positive output +Q of the flip-flop 46, and cuts off the power transistor 44 through the driver 46. At this time, the negative signal of the negative output −Q of the flip-flop 46 turns on the transistor 68, enabling the transistor 68 to provide a discharging path for the capacitor 66. When the capacitor 66 is charged, the power transistor 44 is in an on state.

In this embodiment, the value of the current provided by the first current source 63 is related with the voltage Vin provided by the DC source 64 and the resistor 65, and is a function of the input voltage Vin or the resistor 65. The outputted current charges the capacitor 66, and the turn-on time of the power transistor 44 is determined by the charging period of the capacitor 66. Referring FIG. 7, the turn-on period of the power transistor 44 is kept constant at all times and may be determined by changing the first reference voltage V3 or the resistance of the resistor 64.

In the second embodiment, during a turn-on period, the polarity of the transformer 42 at its secondary side results in the un-conductivity of the diode 28. The secondary side current Is at this time is zero. When the capacitor 66 has a voltage difference between its two terminals greater than the voltage V3, the flip-flop 46 turns off the power transistor 44, i.e., the transistor 44 enters into a cut-off state. After the power transistor 44 is cut off, the diode 28 is turned on, enabling the previously stored magnetic energy in the transformer 42 to charge the high voltage capacitor 24. At this time, the transformer 42 has a current is flowing through in its secondary side, and the current is reduces. When the voltage Vds across the power transistor 44 is greater than the sum of Vin and the voltage V2, the comparator 54 outputs a low level signal to the set terminal of the flip-flop 46 and the power transistor 44 is kept in a cut off state. The turn-off control circuit 50 maintains the power transistor 44 in the cut-off state. Until the power transistor 44 has the voltage drop Vds smaller than the sum of Vin and the voltage V2, the comparator 54 outputs a high level signal to the set terminal of the flip-flop 46, and the power transistor 44 turns on after the operation of the driver 48. In other words, the power transistor is turned on by the turn-off control circuit 50 when the energy of the transformer is released to a threshold defined by the summation of Vin and V2. The time that the turn-off control circuit 50 turns off the power transistor 44 is termed an off time.

In the second embodiment, the turn-off time of the power transistor 44 is determined by the current Is flowing through the secondary side of the transformer 42. When the current Is in the secondary side falls to zero, the voltage on the primary side of the transformer falls to 0V at a rapid speed and the voltage drop Vds of the power transistor 44 rapidly falls to Vin. Since the energy stored in the secondary side of the transformer has been totally released, the power transistor 44 again turns on when the power transistor 44 has the Vds falling to the sum of Vin and the voltage V2. For example, when Vds is 50 mV, the flip-flop 46 has a set terminal (S) output of 1. The time period that the secondary side current Is falls from Ipeak/N to 0 is determined by the turn-off time of the power transistor 44. With the circuit in the second embodiment, a maximum turn-on time is set so as to avoid transformer saturation.

Figure 7:
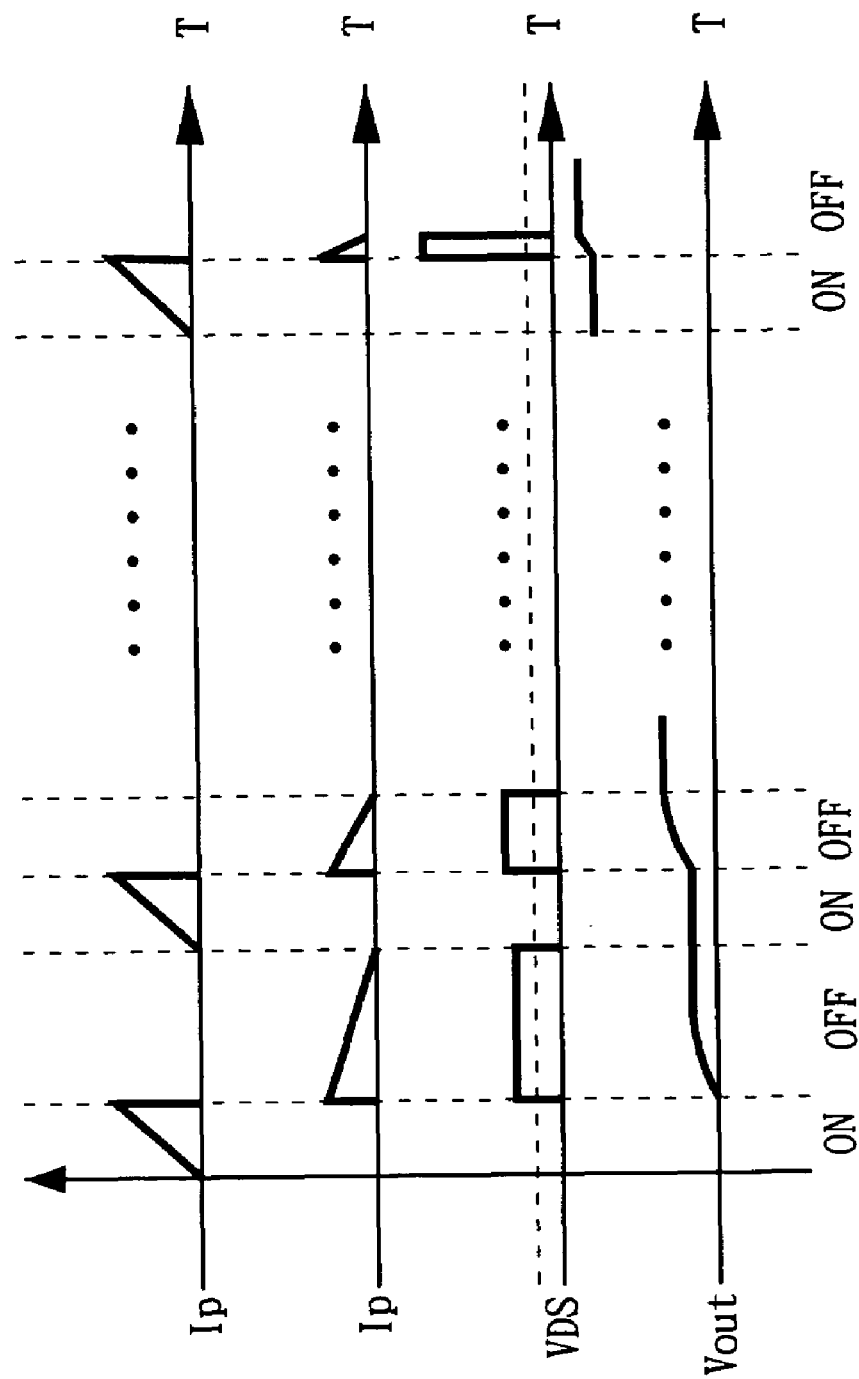
FIG. 7 is a diagram illustrating the relation of the voltage level of a primary side current, a secondary side current, a charging current and a high voltage capacitor under a boundary charging mode according to the second embodiment of the invention.

Turning to FIG. 7, when the power transistor 44 turns on and off in the second embodiment, the variations of the primary side current Ip, secondary side current Is and the output voltage Vout may be clearly seen.

The transformer 42 at its secondary side has the Is of the ramp-down slope of Vout/Ls and the turn-off time of the power transistor 44 becomes shorter and shorter. Since the turn-on time is fixed, the turn-off time reduces and the switching frequency of the power transistor 44 is frequency variable.

In the second embodiment, the standby detection circuit 70 further comprises a third comparator 74 comparing the voltage across the resistor 30 and the second reference voltage V4, and a fourth comparator 76 comparing the voltage across the resistor 30 and the third reference voltage V5. The second and third reference voltages V4 and V5 have a particular relationship. For example, the third reference voltage V5 is 0.9 times the fourth reference voltage V4. When the voltage of the resistor 30, equal to the voltage across the capacitor 28, reaches the second reference voltage V4, the third comparator 74 outputs a turn-off signal to turn off the turn-off control circuit 50 and the turn-on control circuit 60. When the voltage of the resistor 30 reaches the third reference voltage V5, the fourth comparator 76 outputs a signal to turn on the turn-off control circuit 50 and the turn-on control circuit 60. Through the operation of the comparator 74 and the fourth comparator 76, the high voltage charging circuit 40 is equipped with an automatic recharging function, i.e., when the voltage drop of the capacitor 28 falls to the third reference voltage V5, the high voltage charging circuit 40 automatically restarts to charge the capacitor 28. The time of automatic recharging Trefresh=−ln(V5/V4)×resistor 30×capacitor 28.

Figure 8:
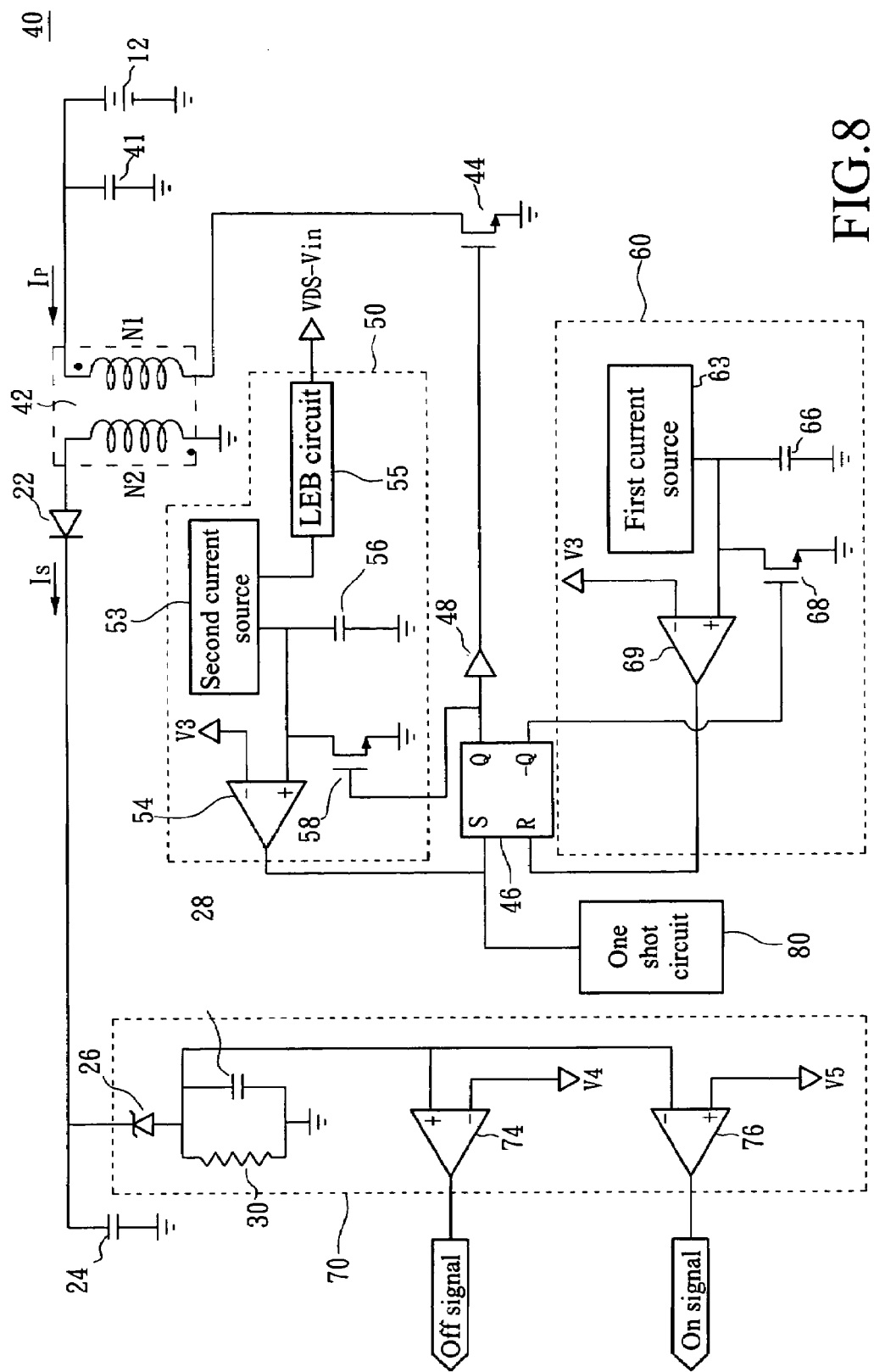
FIG. 8 is a block diagram of a third embodiment of the invention.

FIG. 8 illustrates a third embodiment according to the invention. In this embodiment, the configuration and operation of the circuit is the same as in the second embodiment except for the turn-off control.

In the third embodiment, the turn-off control circuit 50 is similar to the turn-on control circuit 60. The turn-off control circuit 50 comprises a second current source 53, a leading edge blanking circuit (hereinafter LEB circuit) 55, a comparator 54, a capacitor 56 and a transistor 58. In addition, the turn-off control circuit comprises a single shot circuit 80 coupled to the set terminal S of the flip-flop 46 to trigger the turn-on control circuit 60. The LEB circuit 55 leaves blank on the rising edge of the pulse for the voltage difference of Vds and Vin. For example, by setting the LEB time to about 200 ns, the generated pulse may be neglected. The second current source 53 is coupled to the LEB circuit 55 and outputs a current as a function of the voltage difference Vds−Vin, i.e., I=f(Vds−Vin). The capacitor 56 is coupled to the second current source 53. The transistor 58 is coupled to the positive input of the comparator 54 and to the positive output of the flip-flop 46 with the gate thereof.

The single shot circuit 80 is used to trigger the turn-on control circuit 60. The first current source 63 has the linear output current I1=f(Vin) as described above to charge the capacitor 66. The time during which the capacitor 68 is charged to the first reference voltage V3 is used to determine the turn-on time of the power transistor 44.

The second current source 53 has a current of I2=f(Vds−Vin), which is consistent with the first current source 63 and is used to charge the capacitor 56. The time during which the capacitor 68 is charged to the first reference voltage V3 determines the turn-off time of the power transistor 44.

In the third embodiment, the first current source 63 and the second current source 53 charge the capacitor 68 so that the averaged voltage of the inductor is zero when the magnetic element is in a stable state, i.e., the relation Vin×Ton=(Vds−Vin)×Toff is satisfied.

Figure 9:
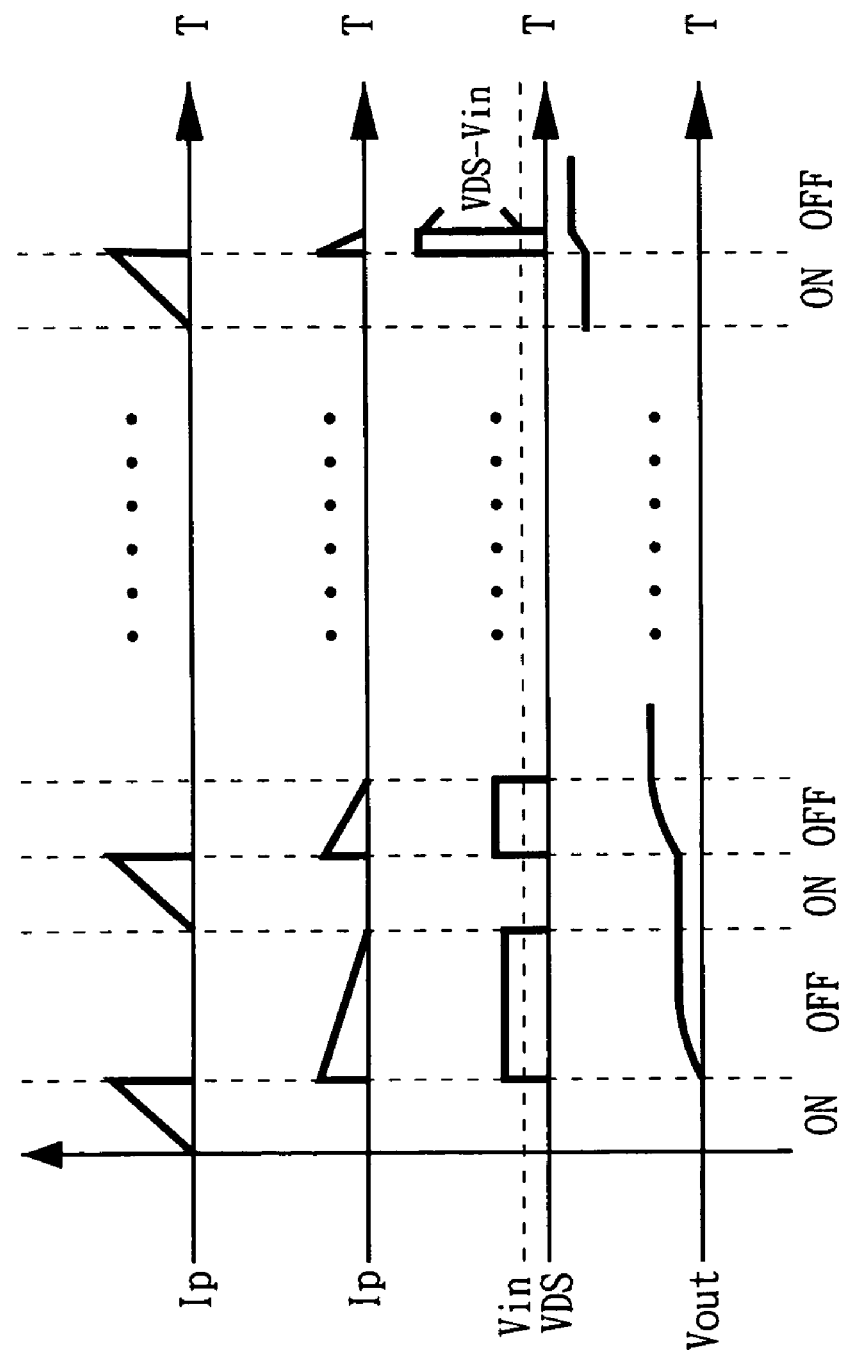
FIG. 9 is a diagram illustrating the relation of the voltage level of a primary side current, a secondary side current, a charging current and a high voltage capacitor under a boundary charging mode according to the third embodiment of the invention.

Referring to FIG. 9, during the turn-on and turn-off time of the power transistor 44, the variations of the primary side current Ip, secondary side current Is and the output voltage Vout in the third embodiment may be clearly known.

According to the principle of the invention, the high voltage charging circuit 40 has the following advantages:

1. Auxiliary windings N3 are not necessary. A smaller Lp may be used to set a smaller value of the turn-on time tON so that a small-sized transformer 14 may be used. The transformer will not become saturated, thus allowing reduction in volume of the high voltage charging circuit.

2. The high voltage charging circuit may operate in a continuous turn-on mode and thus has a higher power conversion efficiency and a shorter charging time.

3. A constant current (the charging current does not vary with Vin) or a variable current (the charging current decreases as Vin falls) may be used in the charging mode, depending upon the user.

4. An automatic recharging function may be set by the user.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A high voltage charging circuit, for charging a high voltage capacitor, comprising:
    a DC source for outputting a large current at a low voltage level;
    a transformer for receiving the large current at the low voltage level and then performing an energy conversion to output a small current at a high voltage level;
    a diode receiving the small current at the high voltage level, the diode then outputting the small current to the high voltage capacitor to charge the high voltage capacitor;
    a power transistor,
        when the power transistor is turned on, enabling the transformer to receive the large current at the low voltage level and then perform an energy conversion without outputting the small current at the high voltage level, and
        when the power transistor is turned off, disabling the transformer to receive the large current at the low voltage level and then perform the energy conversion and output the small current at high voltage level;
    a turn-on control circuit for controlling a turn-on time of the power transistor;
    a turn-off control circuit for controlling a turn-off time of the power transistor, wherein the power transistor is turned off by the turn-off control circuit when the energy of the transformer is released to a threshold; and
    a standby detection circuit for stopping switching the power transistor when the voltage of the high voltage capacitor is greater than a predetermined voltage, wherein the standby detection circuit further comprises:
        a breakdown device coupled to the high voltage capacitor;
        a first comparator for detecting a terminal voltage of the breakdown device, wherein the power transistor is stopped from switching when the terminal voltage of the breakdown device is greater than a first predetermined value; and
        a second comparator for detecting the terminal voltage of the breakdown device, wherein the power transistor is restored to switching when the terminal voltage of the breakdown device is less than a second predetermined value.

2. The high voltage charging circuit as recited in claim 1, wherein the turn-on control circuit comprises:
    a resistor;
    a capacitor;
    a current mirror providing a corresponding charging current to the capacitor based on a current flown through the resistor and charging the capacitor, wherein the charging current is a function of the DC source or a resistor; and
    a third comparator outputting a reset signal to a positive output of a flip-flop to turn on the power transistor when the voltage level of the capacitor is greater than a first reference voltage level.

3. The high voltage charging circuit as recited in claim 2, wherein a negative output signal at a negative output of the flip-flop turns on a transistor for providing a discharging path for the capacitor.

4. The high voltage charging circuit as recited in claim 2, wherein the turn-off control circuit comprises:
    a resistor sensing the small current at high voltage level to the transformer;
    a voltage source connected to the resistor and providing a second reference voltage; and
    a fourth comparator outputting a turn-off signal to the flip-flop to turn off the power transistor when a voltage drop of the resistor is greater than the second reference voltage.

5. The high voltage charging circuit as recited in claim 1, wherein the turn-on control circuit comprises:
    a capacitor;
    a first current source configured to charge the capacitor, wherein the first current source is a function of the DC source or a resistor; and
    a fifth comparator configured to detect a charging voltage of the capacitor, wherein the power transistor is turned off when the charging voltage reaches a predetermined value.

6. The high voltage charging circuit as recited in claim 5, further comprising a transistor to form a discharging path to discharge the capacitor.

7. The high voltage charging circuit as recited in claim 5, wherein the turn-off control circuit comprises:
    a second capacitor;
    a second current source coupled and providing a second charging current to charge the second capacitor, wherein the second charging current is a function of the voltage drop of the power transistor and the DC source;
    a comparator outputting a turn-off signal to the flip-flop to turn off the power transistor when the second capacitor has a voltage level greater than a reference voltage.

8. The high voltage charging circuit as recited in claim 7, wherein a positive output signal at the positive output of the flip-flop also turns on a transistor to provide a discharging path to the capacitor.

9. The high voltage charging circuit as recited in claim 7, wherein the turn-off control circuit further comprises a leading edge blanking (LEB) circuit coupled to the second current source.

10. The high voltage charging circuit as recited in claim 1, wherein the turn-off control circuit comprises
    a comparator configured to detect a terminal voltage of the power transistor, wherein the power transistor is turned on when the terminal voltage reaches a predetermined value.

11. The high voltage charging circuit as recited in claim 10, wherein the comparator comprises a first and a second input terminal, the first input terminal coupled to the DC source, and the second input terminal coupled to a terminal of the power transistor.

12. The high voltage charging circuit as recited in claim 11, wherein the first input terminal is coupled to the DC source through an offset voltage source.

13. The high voltage charging circuit as recited in claim 1, wherein the standby detection circuit comprises a resistor and a comparator outputting a detection signal to stop switching the transformer when the voltage drop of the resistor is greater than a reference voltage.

14. The high voltage charging circuit as recited in claim 1, wherein the transformer has a primary side and secondary side having an opposite polarity as compared thereto.

15. The high voltage charging circuit as recited in claim 1, wherein the second predetermined value is proportional to the first predetermined value.

* * * * *